Sept. 7, 1954  E. GRETENER  2,688,271
ILLUMINATION SYSTEM FOR THE PROJECTION OF PICTURES
Filed March 30, 1951  3 Sheets-Sheet 1
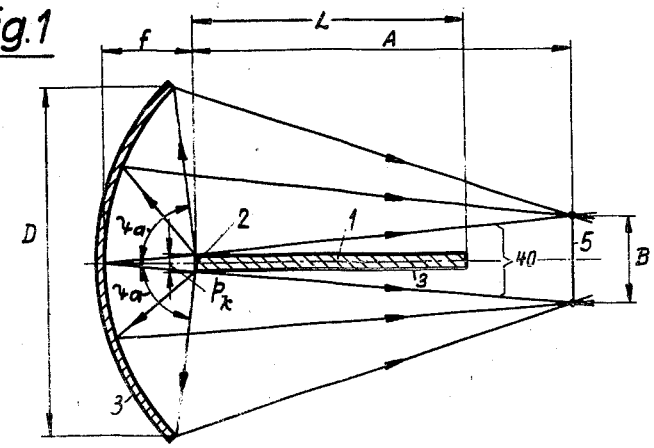
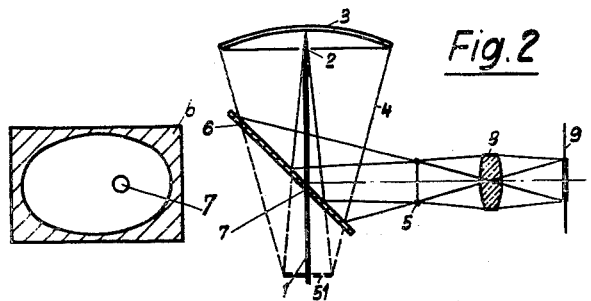
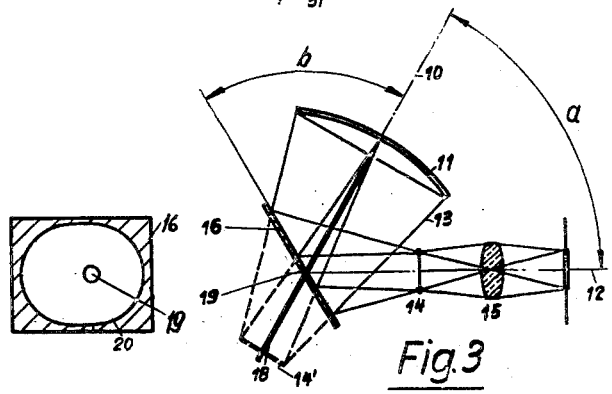
INVENTOR.
Edgar Gretener,
BY Pierce, Scheffler + Parker,
ATTORNEYS Sept. 7, 1954 E. GRETENER 2,688,271
ILLUMINATION SYSTEM FOR THE PROJECTION OF PICTURES
Filed March 30, 1951 3 Sheets-Sheet 2
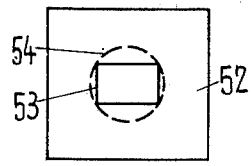
Fig. 4b
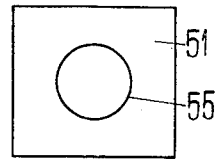
Fig. 4a
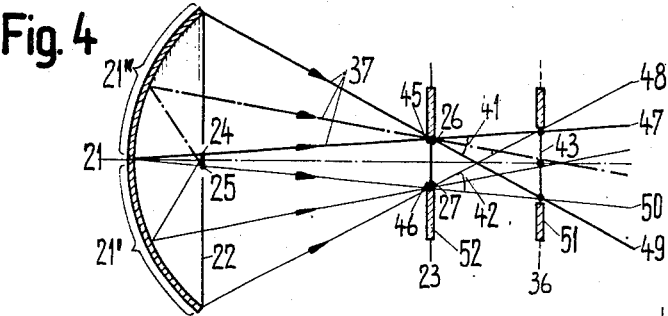
Fig. 4
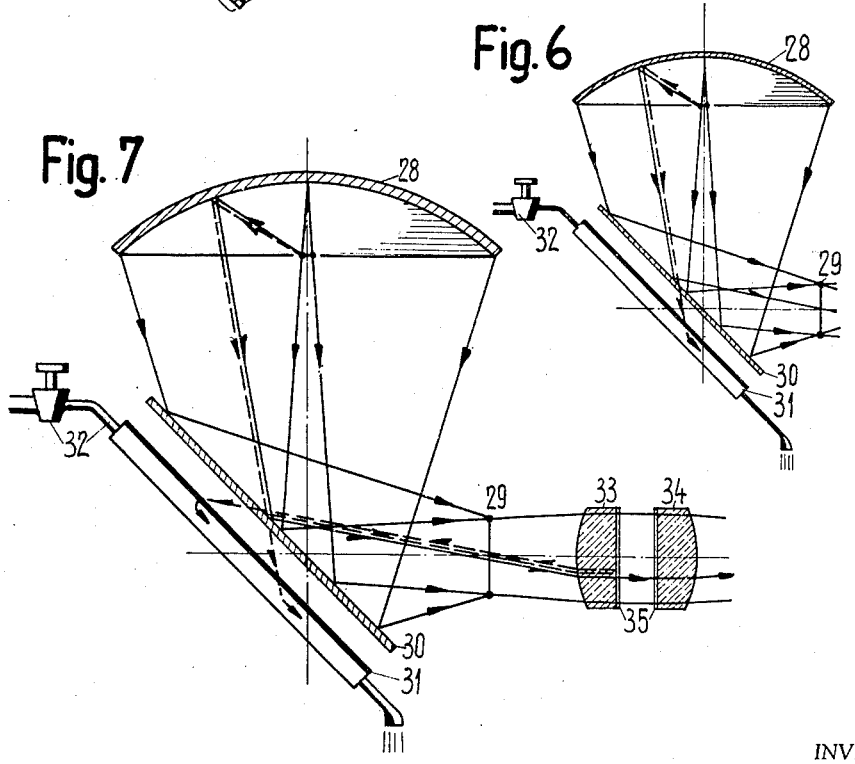
Fig. 6
Fig. 7
INVENTOR:-
Edgar Gretener,
BY Pierce, Scheffler & Parker,
ATTORNEYS.

Sept. 7, 1954          E. GRETENER          2,688,271
ILLUMINATION SYSTEM FOR THE PROJECTION OF PICTURES
Filed March 30, 1951          3 Sheets-Sheet 3
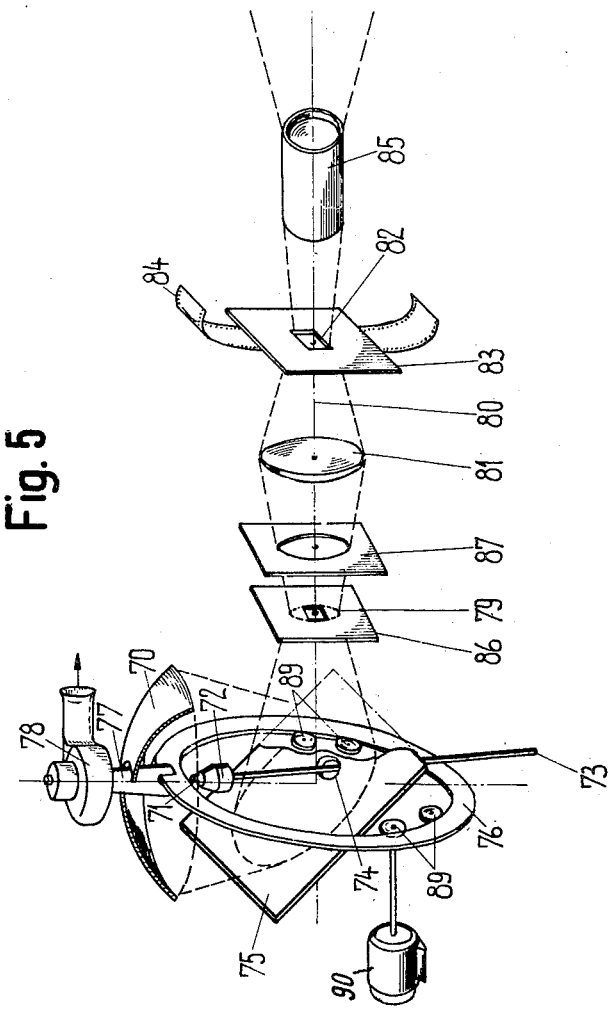
INVENTOR.
Edgar Gretener,
BY Pierce, Scheffler + Parker,
ATTORNEYS.

Patented Sept. 7, 1954

2,688,271

UNITED STATES PATENT OFFICE 2,688,271

ILLUMINATION SYSTEM FOR THE PROJECTION OF PICTURES

Edgar Gretener, Zurich, Switzerland

Application March 30, 1951, Serial No. 218,425

Claims priority, application Switzerland March 31, 1950

14 Claims. (Cl. 88—24)

The present invention relates to illumination systems for the projecton of pictures, and more particularly to illumination systems which include high-intensity arc lamps employing blown arcs.

The design of illumination systems which are intended to utilize substantially the total light flux emanating from the light source for the illumination of the picture aperture presents certain difficulties if the sizes of the different parts of the system are not to exceed certain reasonable limits. This problem of reasonable size applies especially to the diameter of concave reflectors when such elements are employed as light condensation means. In the following specification reference will be made only to concave reflectors but it should be understood, however, that all explanations and conclusions are equally valid if condenser lenses or lens systems are employed instead of a reflector.

An object of the invention is to provide an illumination system for projection purposes which realizes optimum dimensions of the light condensing elements without surpassing reasonable limits for the overall size of the illumination apparatus. An object is to provide an illumination system which employs a high-intensity arc lamp and which is free from the limitations of prior systems as to the length of carbon electrodes which may be used. A further object is to provide illumination systems including high-intensity arc lamps and in which the mechanical parts for the support and operation of the arc lamps are located outside of the path of the utilizable light beam. An object is to provide illumination systems of the type stated which afford a maximum and homogeneous illumination of the projection aperture and a screening off of all light which is useless for projection. More specifically, an object of the invention is to provide an illumination system including a condensing system for forming an image of an arc light source of illumination, and a mirror in the path of the light beam from the condensing system to deflect the image of the light source towards the projection aperture. Other objects are to provide, in illumination systems of the type last stated, lens systems for projecting the source image upon or closely adjacent the projection aperture. A further object is to provide, in illumination systems which include mirrors for deflecting an image of the light source towards projection apertures, dichroic mirrors for eliminating infra-red rays from the utilizable light flux at the projection aperture.

These and other objects and the advantages of the invention will be apparent from the following specification when taken with the accompanying drawings, in which:

Fig. 1 is a schematic diagram of an illumination system including an arc lamp and a concave reflector;

Figs. 2 and 3 are schematic sections, on planes through the axes of the light beams, of illumination systems constituting different embodiments of the invention;

Figs. 2a and 3a are plan views of the deflection mirrors of Figs. 2 and 3 respectively, and indicating the areas of incidence of the light beams upon the mirrors;

Fig. 4 is a schematic sectional view of a light source and concave reflector having four focal points in each meridional section;

Figs. 4a and 4b are elevations of diaphragms for use in an illumination system as shown in Fig. 4;

Fig. 5 is a perspective view of an illumination system according to the invention which includes a ring-shaped electrode;

Fig. 6 is a fragmentary sectional view through an illumination system in which the mirror is of dichroic type and eliminates infra-red rays from the picture-illuminating beam; and Fig. 7 is a vertical sectional view through another embodiment in which the deflection mirror and the condenser lenses, in combination, eliminate infra-red rays from the picture-illuminating beam.

The design problems or difficulties in constructing a projection system of reasonably small size will be apparent from Fig. 1 which shows, graphically, the mutual dependence of the sizes of the several parts upon a concave reflector or equivalent condensing system. Reference numeral 1 identifies the positive carbon of an arc lamp which has an arc crater at point 2, but the other elements of the lamp, for clarity of illustration, are not shown. An elliptical concave reflector 3 projects the light issuing from the crater upon the aperture 5 of the projection apparatus.

Crater 2 and aperture 5 are located respectively at the two focal points of the elliptical reflector. If the aperture is to be illuminated fully and without loss of light, the axial magnification $V_a$ and the focal length $f$ of the reflector are determined by the diameter $p_k$ of the positive crater and by the dimensions $B$ of the picture aperture. In order to permit the employment of positive carbons of sufficiently large utilizable length the distance A between crater and aperture may not, however, be reduced below a certain minimum value.

The axial magnification $V_a$ of an elliptical reflector is equal to the magnification incurred by a light beam 40 in the vicinity of the optical axis of the reflector and is obtained from the expression:

$$V_a = \frac{f+A}{f}$$

which may be transformed to $$f = \frac{A}{V_a - 1}$$

Assuming the characteristic values of an arc lamp of e. g. 100 amperes arc current, the diameter $p_k$ of the positive crater is 7 mm. With a diameter of 26 mm. of the aperture for 35 mm. standard film the ensuing axial magnification $V_a$ is $$V_a = \frac{26}{7} = 3.7$$

In projection lamps for 35 mm. standard film the distance A should not be less than 60 cm. and consequently the focal length of the reflector should be $$f = \frac{60}{3.7 - 1} = 22.2 \text{ cm.}$$

With a light collecting angle $\psi_a$ of the concave reflector equal to 80° the diameter D of the reflector is obtained as approx. 70 cm. The employment of a reflector of that considerable size would entail dimensions of the complete illumination system incompatible with the requirements for practical use. It must be remembered that the diameter of reflectors of lamps actually employed generally does not exceed 35 to 40 cm. The employment of reflectors of such small diameter and consequently reduced focal length, in view of the above mentioned conditions, requires excessive magnification ratios. The light spot on the aperture plate, representing the image of the positive crater, will considerably overlap the boundaries of the aperture. This overlapping of the light spot over the aperture means loss of light and undesirable heating of the aperture plate.

According to the present invention such difficulties are overcome by the employment of a high intensity arc for the illumination of the aperture of a projector, where a blown arc is employed in combination with an optical illumination system, comprising a concave reflector, a deflection mirror and a condenser lens, the concave reflector producing an intermediate image of said blown arc, the deflection mirror deflecting the light beam issuing from said concave reflector and locating said intermediate image outside of the light path between concave reflector and deflection mirror, and the condenser lens projecting said intermediate image upon the aperture of the projector.

In Fig. 2, reference numeral 1 identifies the positive carbon with the light emitting crater 2. The other parts of the arc lamp, which may comprise a blown arc, are not shown in order not to impair the clarity of representation. The crater 2 is located at the first focal point of an elliptical concave reflector 3. An image 51 of said crater 2 would be formed at the second focal point by the effect of the elliptical reflector 3, but by means of a deflection mirror 6, the light beam 4 is deflected in such a way that an image 5 is laterally of the beam 4. The rear end of the positive carbon 1 passes through a hole 7 in the deflection mirror 6 and thus the length of said carbon is not restricted by the distance between crater 2 and image 51. The carbon 1 may be made as long as is necessitated by a sufficiently long operation period, whereas the distance between crater and image may be made short enough to keep the diameter of the reflector within reasonable limits. The absence of any conditions inherent in the illumination system restricting the length of the carbon is of particular importance if the brilliancy of the luminous flux of the arc is to be increased. The diameter of the light emitting positive crater is limited to a certain maximum value which is determined by the numerical aperture of the projection lens and by the size of the picture aperture. This maximum diameter is approximately 6.5 mms. Further increase of the luminous flux can only be obtained by raising the brilliancy of the crater. In a blown arc this is easily achieved by increasing the current density of the positive carbon, as will be explained later, but naturally the consumption rate of the positive carbon will also increase and along with it the length of the positive carbon required for a satisfactory operation period.

The image of the crater 2 is projected upon the aperture 9 by means of a condenser lens 8. The employment of an intermediate image 5 is highly advantageous as the optical path length between the light source and the intermediate image may be made considerably smaller than would be possible if the aperture were directly illuminated by the concave reflector. The intermediate image may be located just outside the light path between concave reflector 3 and the deflection mirror 6 as shown in Figs. 2 and 3 and the optical path length between light source and image reduced to a minimum. This would be impossible if the aperture was to be illuminated directly. It must be kept in mind that the aperture plate comprises additional structural parts, e. g. for supporting, guiding and transporting the film, which would require the aperture to be located farther away from the deflection mirror in order to avoid screening by such parts.

The deflection mirror is preferably given a plane surface which can be manufactured at lowest cost and represents the most correct optical solution. If, however, necessity should demand special additional optical effects to be achieved, the deflection mirror may be given a curved or differently shaped surface in place of a plane one.

An embodiment requiring particularly little room is obtained if the axes of the concave reflector and the condenser lens are located in a common vertical plane. In such cases the rear end of the positive carbon and the parts required for servicing and replacing said carbon are located in the space underneath the projection lamp and adequate space will be available even in projection cabins of most reduced dimensions.

An arc lamp with deflected light path where the axes of the concave reflector and the condenser lens are disposed in a vertical plane is suitable for practical application only in conjunction with a blown arc as light source. In a blown arc, as is well known, the electrical discharge is concentrated by the air stream in the cylindrical space in front of the positive crater independently of the position of the arc in space. The arc is stabilized and is indifferent to overload or to its position in space. A vertical arrangement of the carbon as described above will therefore present no difficulties. On the contrary, in a customary Beck-arc the anode tail flame would be subject only to the thermal lift and would endanger the carbon housing and the reflector.

The economy in space can be increased still further if the angle included by the axes of the concave reflector and condenser lens is made less than 90°, as shown in Fig. 3. The axis 10 of the concave reflector 11 and the axis 12 of the condenser lens 15 include an angle $a$, which is less than 90°. Further constructional details of the projection system are not included in the drawing for the sake of clarity. The concave reflector 11 and the light beam 13 issuing from its surface are disposed in the clear space above the intermediate image 14 and the condenser lens 15, whereas the rearward edge of the reflector 11 need not extend beyond, and may be in front of the rear edge of the deflection mirror 16. The positive carbon 18, which again passes through a hole 19 of mirror 16, is tilted forwards and its lower end thus is more easily accessible than in vertical position. Furthermore this arrangement substantially reduces the necessary size of the deflection mirror as is evident from Fig. 3a. The area of incidence of the illuminating light beam on the deflection mirror is of elliptical shape. This ellipse approaches circular form as the angle $b$ included by the plane of the deflection mirror and the optical axis 10 of the concave reflector 11 increases. This angle however corresponds to the equation $b=90°-\frac{1}{2}a$. Furthermore a steeper position of the deflection mirror advantageously reduces the tendency of dust and fine particles to be deposited on the surface of the mirror.

In order to achieve the utmost light output and at the same time a homogeneous distribution of light intensity across the intermediate image, a concave reflector is preferably employed which provides four "focal points" in every meridional section, see Fig. 4.

In such a concave reflector, which has been described in detail in my copending application Ser. No. 5,410, filed January 30, 1948, now Patent 2,624,234, granted January 6, 1953, an elliptic arc is employed as generatrix of the reflecting surface. Said surface is obtained by rotating around an axis, an elliptical arc having a main geometrical axis which is inclined to the rotation axis by a small angle. Thus a rotational surface is generated the optical axis of which coincides with the axis around which the arc is rotated. As the axis of the ellipse is tilted in such a way that its two focal points do not lie on said axis of rotation, the concave reflector, in place of the two focal points of customary elliptical mirrors, possesses two focal circles which are orientated at right angles to the optical axis of the reflector. These two circles intersect with any meridional plane of the rotational reflecting surface in four "focal points" which are conjugate to the appertaining half sections of the reflector in that meridional plane in two pairs. In a meridional section of such a reflector, as shown in Fig. 4, the reflecting surface 21 has the object-sided and the image-sided focal planes 22, 23 respectively formed by said focal circles and the four "focal points" 24, 25, 26 and 27 in which such focal circles intersect with the plane of the drawings, i. e. a meridional plane. The conjugate object-sided and image-sided "focal points," e. g. 24 and 27 or 25 and 26, are disposed on opposite sides of the optical axis of reflector 21, the image-sided focal point, e. g. 26 or 27, and the conjugate half sections of the reflector, e. g. 21' and 21'', are disposed on the same side of the optical axis of the reflector 21.

Due to the well known effect of an elliptical curve, a point image of any focal point, e. g. 25, is formed at the second appertaining focal point 26 by the appertaining reflector half 21'. This is equally valid for points 24 and 27, and reflector half 21'' respectively. The correspondence of reflector halves and focal points may also be stated by experiment. An observer looking towards the reflector e. g. from point 26, through a small hole in a diaphragm will see only the upper half of the reflector luminous, i. e. that part of the reflector appertaining to the point of observation.

If a light source with flat circular light emitting surface e. g. the positive crater of a blown arc, is located at the lamp-sided focal plane 22 so that in every meridional section both lamp-sided focal points coincide with opposite points on the circumference of said source, and if the area to be illuminated, is located at the object-sided focal plane 23 and both object-sided focal points coincide with the circumference of said area, the intensity of illumination will be homogenized or uniform across this area, as that has been explained in detail in the above mentioned specification.

It is to be understood that the light spot thus formed at the object-sided focal plane of the reflector surface is not an image of the light source in the proper sense of the word. No clearly defined image of the light source, viz. of the arc crater located at the lamp-sided focal plane, is formed, but only a light spot with homogeneous and uniform distribution of illumination intensity. This light spot, however, corresponds to the image of the light source formed by conventional light condensing means, such as e. g. elliptical concave reflectors, and will take the place of such an image if employed in an illumination system according to the present invention. In the present specification the terms "image of the light source," "image of the arc" or "intermediate image" are therefore to be construed as likewise extending to the light spot of a concave reflector of the kind described above.

Highest light efficiency and simultaneously an extremely homogeneous illumination is obtained if the axial magnification of the reflector is made equal to the ratio of diameters of light emitting surface of the blown arc and of said area to be illuminated.

As will be seen from Fig. 4, a plane 36 exists inside the light beam produced by a reflector surface as above described which is disposed at right angles to the optical axis thereof and in which the light cones issuing from the different points all over the plane of the intermediate image intersect with a common base. This is shown in Fig. 4 for e. g. two points 45 and 46 lying at the edges of the intermediate image from which points two light cones 41 and 42 issue, respectively. The corresponding envelope rays of the two beams, viz. 47—48 and 49—50 intersect in pairs on plane 36, whereon line 43 forms the common base line of both cones. It will be understood that these cones in reality possess a circular or at least approximately circular cross-section and that consequently line 43 represents the intersection of the plane of the drawing with the base circle common to both cones. This is obviously equally valid for all other light cones issuing from all the points located all over the entire plane of the intermediate image. A diaphragm 51 variable in aperture located at plane 36 will thus affect, i. e. vary the angle of divergence, of all such light cones in an identical manner. In contradistinction thereto, a diaphragm located away from that plane will affect the various cones in a varying manner and give rise to undesirable effects, such as e. g. vignetting.

Fig. 4a represents an elevation of such a diaphragm, the plane of drawing of Fig. 4a being at right angles to the plane of drawing of Fig. 4. The diaphragm plate 51 is given a circular opening 55 having its center adjacent the optical axis of the projector and having such a diameter that the aperture of the light cones passing therethrough corresponds to the utilizable aperture of the projection lens.

The diaphragm plane of the illuminating light beam is preferably located farther away from the concave mirror than the plane of the intermediate image which may be achieved by suitable construction of said concave reflector. In this "diaphragm" plane a diaphragm is preferably located with the object of adapting the angle of divergence of the light beam issuing from the concave reflector to the numerical aperture of the projection lens. By such a diaphragm all light which is superfluous with regard to the purpose of projection is cut off and heating of film and projection lens is thus reduced.

A further elimination of superfluous light can be achieved, and undesirable heating of the aperture plate by such parts of the circular light spot on the aperture plate that overstep the boundaries of the rectangular aperture, can be effectively avoided if a second diaphragm 52 is inserted at the plane of the intermediate image. The shape of the opening of this corresponds to the shape of the picture aperture so that the light flux passing through said opening exclusively illuminates the picture aperture. Such a diaphragm is shown in elevation by Fig. 4b. The diaphragm plate 52 is given a rectangular opening 53 corresponding in shape to the film aperture. The circumference of the intermediate image 54 is indicated in dotted lines. Only such light is passed by the opening 53 that will illuminate the film in the aperture whereas all light overlapping that opening is shielded off.

If the homogeneity of illumination obtained by such a concave reflector with four "focal points" is to be transferred to the aperture with undiminished exactness, a condenser lens is preferably employed which is given such a curvature that in every meridional plane punctiform images of the edges of said intermediate image are formed at the plane of the aperture, i. e. the edges are imaged as point upon the plane of the aperture.

A blown arc lamp with deflected light path is particularly advantageous if a ring shaped cathode is employed. A ring cathode enables an extremely short arc gap at highest current densities of the positive carbon to be obtained. Safe and reliable operation of the lamp is ensured up to the highest current loads without carbide pearls or mushrooms being formed on the negative electrode, which disturbances occur with rod shaped electrodes and are a very much dreaded source of trouble. A further practical advantage of the employment of a ring cathode in a lamp with deflected light path resides in the fact that a great portion of the ring can be disposed outside the path of projection light as will be seen from Fig. 5, showing such an illumination system in perspective representation.

A part of the concave reflector 70 has been cut out in the drawing with the object of showing more clearly the other details of the lamp. The positive carbon 71 is guided in the positive carbon housing 72 and its rear end 73 passes through a hole 74 in the deflection mirror 75. The housing 72 of a blown arc contains a blower nozzle so disposed that the issuing air stream surrounds the positive carbon and the space before the positive crater coaxially. Thus the arc discharge forms an intensely luminous cylinder between the positive crater and a spot on the inner edges of the cathode ring 76. The flame gases of the arc are removed by a suction pipe 77 and exhaust blower 78. The suction pipe 77 passes through a hole at the centre of the concave reflector 70.

The light emanating from the arc is condensed by the concave reflector 70 and an intermediate image 79 is located on the optical axis 80 of the projection system by the above described cooperative effect of reflector 70 and deflecting mirror 75. By means of a condenser lens 81 said image is projected upon the aperture 82 on the film gate or aperture plate 83 which supports a film 84. A projection lens 85 serves for projecting upon the projection screen the film frame located behind the aperture 82. A diaphragm 86, the rectangular opening of which corresponds to the form of aperture 82, is located at the plane of the intermediate image 79 and serves to prevent heating of the film gate 83 by superfluous light. A second diaphragm 87 located at the "diaphragm" plane of the illuminating light beam, serves to adapt the angle of divergence of the beam to the numerical aperture of the projection lens 85. In order not to impair the clearness of illustration all means serving to support carbon housing 72, concave reflector 70, deflection mirror 75, condenser lens 81, film gate 83, projection lens 85 and diaphragms 86 and 87 are not shown in the drawing.

The inner edge of the ring cathode 76 is located opposite to the crater of the positive carbon 71 so that the arc is struck between the crater and a spot on the inner edge. The ring 76 is supported by a number of rolls 89 and is slowly rotated during operation by a motor 90 driving one or more of said rolls. In order to compensate for the consumption of the inner edge by the electric arc the rolls may be mounted on a common support displaceable in such a way that the ring may be shifted towards the positive carbon as the edge is burned away. By the rotation of the ring the evaporation products from the positive carbon which tend to deposit on the edge of the cathode ring are continually removed from the space of the arc discharge and are oxidized in the free air or in the outer parts of the air stream. The diameter of the ring is made so large that the ring extends around the deflecting mirror. The rear end consequently is removed from the illuminating light path and undesirable shading of light is thus avoided. Likewise all the means required for rotating, supporting and shifting the ring towards the positive carbon during operation may be accommodated outside the light path either sideways or rearwards of the deflection mirror and shading is by such parts avoided.

The combination of an arc lamp with ring shaped cathode with an illumination system employing a deflected light path according to the present invention not only permits the full utilisation of the advantages offered by both features but furthermore remedies any inconveniences arising from the separate employment of one of them.

If the illuminating light flux issuing from the light source exceeds a certain value lying in the neighbourhood of approx. 10,000 lumens a heat filter must be inserted into the light path. Otherwise the film will be damaged during projection. This filter will eliminate infrared radiation from the flux of visible light. An arc lamp with deflected light path, as set forth by this invention, permits elimination of infrared radiation in a very simple manner as is shown in Fig. 6. A concave reflector 28 forms an intermediate image 29 of the light source which is reflected by a deflection mirror 30. The deflection mirror 30 is of dichroic type with a semitransmittent coating which transmits infrared radiation (as indicated in dashed lines) but reflects visible light (indicated in full lines). Such coatings, the manufacture of which is well known, are generally produced by condensation of evaporated material in high-vacuum. An absorption plate 31 advantageously is located rearward of the plane of the infrared transmitting deflection mirror which absorbs the infrared radiation transmitted by the mirror and removes the heat by additional cooling means 32, e. g. air cooling or water cooling as schematically indicated.

In lamps operating with extremely high light intensity it may eventually be of advantage to institute means for the elimination of infrared radiation additional to such a semitransparent deflection mirror.

As is shown in Fig. 7, this is easily obtained by separating a condenser lens into two partial lenses 33 and 34 and providing a "telecentric" light path between the partial lenses. In a telecentric light path the image of the light source is formed at infinity, i. e. the central rays of all light cones making up such a telecentric beam are parallel. A coating 35 similar to that of the deflection mirror is applied to one or both of the interior refracting surfaces of the partial lenses 33 and 34, which coating transmits visible light and reflects infrared radiation. In a telecentric light path the conditions for a satisfactory filtering effect of such coatings are particularly advantageous, as in a telecentric light path the angle of incidence of the light rays upon the glass surface assumes a minimum value. Thus the intermediate zone between transmission and reflexion ranges may be made very narrow and the part of the spectrum to be eliminated may approach very closely to the range of visible light. The infrared radiation reflected by the coating of the condenser (as indicated in dashed lines) back to the deflection mirror will be transmitted by the latter and absorbed by an absorption plate 31. This combination of an infrared transmitting deflection mirror with an infrared reflecting condensor lens achieves an extremely high efficiency of filtering as several heat filters are employed working in series.

I claim:

1. In an illumination system for the projection of pictures, the combination of means including a positive electrode for forming a blown arc, a projection aperture at which the picture to be projected will be located, a concave reflector concentrating the light flux emanating from said arc to form a light beam and project an image of the arc, and a deflecting mirror in the path of said light beam to deflect said image towards said aperture; said deflecting mirror having an opening therethrough through which said positive electrode extends, and the optical axes of said concave reflector and of said projection aperture being disposed in a common vertical plane and at an angle to each other.

2. In an illumination system, the invention as recited in claim 1, wherein said mirror is a dichroic mirror reflecting visible rays and transmitting infra-red rays.

3. In an illumination system for the projection of pictures, the combination of means for forming a blown arc, a projection aperture at which the picture to be projected will be located, a concave reflector concentrating the light flux to form a light beam and project an image of the arc, and a deflecting mirror in the path of said light beam to deflect said image towards said aperture; said concave reflector being disposed with its cavity directed downward and substantially above said deflecting mirror.

4. In an illumination system, the invention as recited in claim 3, wherein said image of the arc formed by said concave reflector is located away from said aperture, in combination with condenser lens means for projecting a further image of said first image upon said aperture.

5. In an illumination system, the invention as recited in claim 3, wherein the reflector and the projection aperture are so positioned that the angle between the optical axes of the same is less than 90°.

6. In an illumination system, the invention as recited in claim 5, wherein the reflecting surface of said concave reflector is defined by rotating about the optical axis of the reflector the arc of an ellipse having a main axis inclined to the optical axis of the reflector, whereby the reflector has four focal points in every meridional section.

7. In an illumination system, the invention as recited in claim 3, wherein said means for forming an arc includes a ring-shaped negative electrode extending around said deflecting mirror, in combination with means for supporting and rotating said ring-shaped electrode positioned at the side of said deflection mirror opposite said concave reflector, whereby the rear part of said negative electrode and its supporting and rotating means do not obstruct the light beam produced by said reflector.

8. In an illumination system, the invention as recited in claim 7, wherein said ring-shaped negative electrode is substantially disposed in a meridional plane of said concave reflector, and wherein said positive electrode is inclined to said meridional plane.

9. In an illumination system, the invention as recited in claim 3, in combination with diaphragm means located in between said deflecting mirror and said projection aperture to screen off light which cannot pass through the projection lens.

10. In an illumination system, the invention as recited in claim 9, where said diaphragm is located between said image and said aperture.

11. In an illumination system, the invention as recited in claim 3, in combination with diaphragm means located at the plane of said image in the path of the light beam from said deflecting mirror to said projection aperture, the shape of the opening of said diaphragm means corresponding to the shape of said aperture to screen off light rays which cannot pass through said projection aperture.

12. In an illumination system, the invention as recited in claim 3, in combination with condenser lens means for projecting said image upon the projection aperture.

13. In an illumination system, the invention as recited in claim 12, wherein said mirror is a dichroic mirror reflecting visible rays and transmitting infra-red rays, and transmitting infra-red rays, and said condenser lens means includes two partial lenses providing therebetween a telecentric light path, one of said partial lenses having a coating transmitting visible rays and reflecting infra-red rays.

14. In an illumination system, the invention as recited in claim 3, wherein said deflecting mirror has a plane reflecting surface.

References Cited in the file of this patent

UNITED STATES PATENTS

| Number | Name | Date |
|---|---|---|
| 1,136,507 | Clark | Apr. 20, 1915 |
| 1,248,456 | Clark | Dec. 4, 1917 |
| 1,268,548 | Deardoff | June 4, 1918 |
| 1,342,894 | Bugbee | June 8, 1920 |
| 1,591,211 | Brenkert et al. | July 6, 1926 |
| 1,750,197 | Schoen | Mar. 11, 1930 |
| 1,750,910 | Stark | Mar. 18, 1930 |
| 1,967,892 | Leibig | July 24, 1934 |
| 2,107,148 | Gretener | Feb. 1, 1938 |
| 2,379,790 | Dimmick | July 3, 1945 |
| 2,422,954 | Dimmick | June 24, 1947 |
| 2,457,042 | Hickman | Dec. 21, 1948 |
| 2,552,185 | Koch | May 8, 1951 |

FOREIGN PATENTS

| Number | Country | Date |
|---|---|---|
| 475,318 | France | Feb. 16, 1915 |
| 291,826 | Great Britain | June 5, 1928 |
| 457,057 | Great Britain | Nov. 20, 1936 |